United States Patent
Brunner et al.

(10) Patent No.: US 8,157,328 B2
(45) Date of Patent: Apr. 17, 2012

(54) ADJUSTABLE VEHICLE HEAD RESTRAINT ASSEMBLY FOR A VEHICLE SEAT

(75) Inventors: Stefan Brunner, Freising (DE); Thomas Frank, Neuburg/Donau (DE)

(73) Assignee: Lear Corporation, Southfield, MI (US)

( * ) Notice: Subject to any disclaimer, the term of this patent is extended or adjusted under 35 U.S.C. 154(b) by 316 days.

(21) Appl. No.: 12/548,691

(22) Filed: Aug. 27, 2009

(65) Prior Publication Data
US 2010/0072791 A1    Mar. 25, 2010

(30) Foreign Application Priority Data
Sep. 22, 2008  (DE) .......... 10 2008 048 313

(51) Int. Cl.
*B60N 2/48* (2006.01)
(52) U.S. Cl. ................................................ 297/408
(58) Field of Classification Search ............ 297/403, 297/408, 410
See application file for complete search history.

(56) References Cited

U.S. PATENT DOCUMENTS

| | | | |
|---|---|---|---|
| 4,265,482 A | 5/1981 | Nishimura et al. | |
| 4,511,180 A * | 4/1985 | Klaus | 297/408 |
| 4,674,797 A | 6/1987 | Tateyama | |
| 4,779,929 A | 10/1988 | Kuchemann | |
| 4,830,434 A | 5/1989 | Ishida et al. | |
| 5,669,668 A * | 9/1997 | Leuchtmann | 297/408 |
| 5,738,412 A | 4/1998 | Aufrere et al. | |
| 6,302,485 B1 * | 10/2001 | Nakane et al. | 297/408 |
| 6,899,395 B2 | 5/2005 | Yetukuri et al. | |
| 6,983,995 B1 | 1/2006 | Veine et al. | |
| 7,055,903 B2 * | 6/2006 | Balensiefer et al. | 297/256.11 |
| 7,073,863 B1 | 7/2006 | Low et al. | |
| 7,232,187 B1 | 6/2007 | Sundararajan et al. | |
| 7,234,778 B1 * | 6/2007 | Toba | 297/403 |
| 2001/0028191 A1 | 10/2001 | Lance | |
| 2003/0098600 A1 * | 5/2003 | Nygren et al. | 297/408 |
| 2005/0156456 A1 | 7/2005 | Robinson et al. | |
| 2005/0242640 A1 * | 11/2005 | Barko et al. | 297/238 |
| 2007/0284929 A1 | 12/2007 | Keller et al. | |
| 2008/0203801 A1 * | 8/2008 | Jammalamadaka et al. | 297/408 |
| 2009/0058162 A1 * | 3/2009 | Boes et al. | 297/406 |

FOREIGN PATENT DOCUMENTS

| | | |
|---|---|---|
| DE | 101 49 455 A1 | 4/2003 |
| EP | 0 267 503 A2 | 5/1988 |
| EP | 0 283 863 A1 | 9/1988 |
| EP | 0 970 846 A1 | 12/2000 |
| ES | 2 027 150 | 5/1992 |
| GB | 2 240 920 A | 8/1991 |
| JP | 5-170021 A | 7/1993 |

* cited by examiner

*Primary Examiner* — Peter R. Brown
(74) *Attorney, Agent, or Firm* — Brooks Kushman P.C.

(57) ABSTRACT

A vehicle head restraint system for a vehicle seat has a support rod with a lateral portion. A head restraint is moveable relative to the lateral portion in a fore/aft direction. A first locking plate and a second locking plate are each moveably mounted to the head restraint to engage the support rod to lock the head restraint relative to the support rod. A rotary link is pivotally connected to the head restraint and interconnects the first and second locking plates. A biasing member is mounted to at least one of the first and second locking plates to bias the head restraint towards a retracted position. An actuator on the head restraint moves one of the first and second locking plates. The rotary link moves the other of the first and second locking plates for disengaging the first and second locking plates from the support rod.

20 Claims, 4 Drawing Sheets

ADJUSTABLE VEHICLE HEAD RESTRAINT ASSEMBLY FOR A VEHICLE SEAT

CROSS-REFERENCE TO RELATED APPLICATIONS

This application claims foreign priority benefits under 35 U.S.C. §119(a)-(d) to DE 10 2008 048 313.3, filed Sep. 22, 2008, now issued as DE 10 2008 048 313 on Mar. 4, 2010, which is hereby incorporated by reference in its entirety.

BACKGROUND

1. Technical Field

Various embodiments relate to adjustable vehicle head restraint assemblies for vehicle seats.

2. Background Art

Vehicle seats are provided with moveable head restraints, which can move to accommodate a head of an occupant. One example of a vehicle seat having a movable head restraint is disclosed in U.S. Pat. No. 6,899,395 B1, which issued on May 31, 2005 to Yetukuri et al.

DETAILED DESCRIPTION OF EMBODIMENTS

As required, detailed embodiments are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the embodiments.

Figure 1:
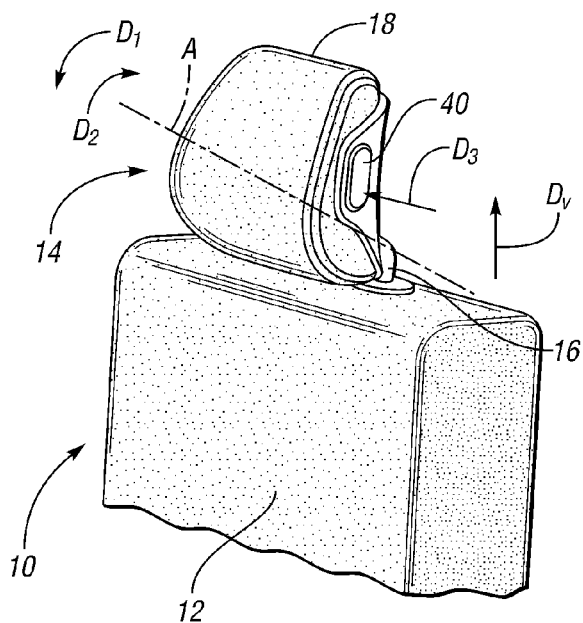
FIG. 1 is a perspective view of a vehicle seat with a head restraint assembly in a design position.
Figure 2:
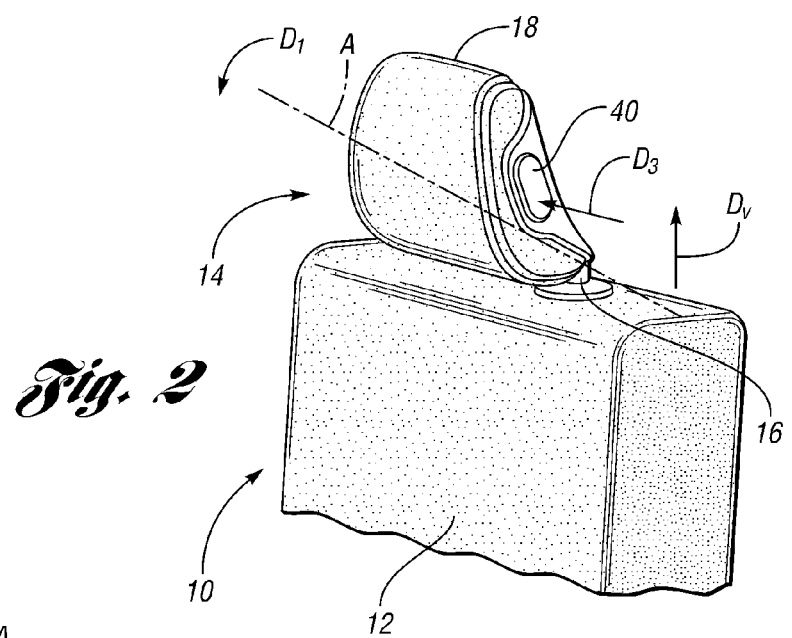
FIG. 2 is a perspective view of the vehicle seat of FIG. 1 with the head restraint assembly in an extended position.
Figure 3:
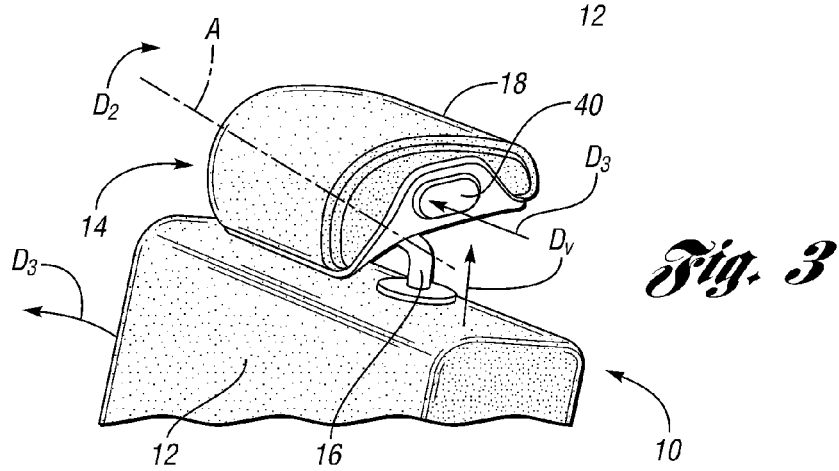
FIG. 3 is a perspective view of the vehicle seat of FIG. 1 with the head restraint assembly in a retracted position.

Referring to FIGS. 1-3, a vehicle seat is illustrated and referenced generally by numeral 10. The vehicle seat includes a seat back 12, which extends from a seat bottom. The seat bottom may be secured to a floor of an associated vehicle for seating an occupant upon the seat bottom. The seat back 12 can be secured relative to the seat bottom for supporting a back of the occupant against the seat back 12. The seat back 12 may pivot relative to the seat bottom to permit ingress and egress to and from a rear seating row and/or to permit an occupant to select a comfortable riding position while sitting in the vehicle seat 10.

A head restraint assembly 14 is mounted to the vehicle adjacent to the seat back 12 via a support rod 16. The support rod 16 can be mounted within the seat back 12 in any suitable manner. Although only one support rod 16 is visible, a pair of support rods 16 may be employed, as discussed below. The support rod 16 may be moveable relative to the seat back 12 in an upright direction as indicated by $D_V$ to adjust height of the head restraint assembly 14 relative to the seat back 12. Once the support rod 16 has been moved relative to the seat back 12 in the direction as indicated by $D_V$, the support rod 16 may be lowered to a different height by moving the support rod 16 in a direction opposite to $D_V$. Of course, any suitable height adjustment for the head restraint assembly 14 is contemplated within the scope of the present intention.

A head restraint 18 forms a structure of the head restraint assembly 14. The head restraint 18 can support a head of an occupant when the occupant is sitting on the vehicle seat 10. The head restraint 18 may include a shell, foam, cushioning and/or trim. The head restraint 18 may have any size and shape desired.

The head restraint 18 is pivotally attached to the support rod 16 so that the head restraint assembly 14 is moveable between the design position, illustrated in FIG. 1, the extended position, illustrated in FIG. 2 and the retracted position, illustrated in FIG. 3. The head restraint 18 can be released from the design or extended position to the retracted position through a single actuator and can have a small size relative to the prior art, as discussed below.

As illustrated, the head restraint assembly 14 rotates about an axis A that is contained within the head restraint assembly 14. Since the axis A extends through the head restraint assembly 14, the size of the head restraint assembly 14 is reduced compared to the prior art. Reduction of size allows for material cost savings and produces a lighter vehicle seat 10, which is advantageous.

In FIG. 1, the head restraint assembly 14 is in the design position. In the design position, the head restraint assembly 14 is generally upright to provide support to the head of the occupant when the occupant is sitting on the vehicle seat 10.

From the design position, the head restraint assembly 14 can be released to allow for movement to the extended position in a direction indicated by arrow $D_1$ Additionally, from the design position, the head restraint assembly 14 can be released and automatically moved to the retracted position in a direction indicated by arrow $D_2$. The head restraint assembly 14 can be moved from the retracted position towards the extended position without activating an actuator. Furthermore, the head restraint assembly 14 can be released to move automatically from the extended position towards the retracted position. In at least one embodiment, the head restraint assembly 14 has a range of motion of one hundred fifteen degrees between the extended position and the retracted position. Any suitable range of motion is contemplated within the scope of the multiple embodiments disclosed.

In FIG. 2, the head restraint assembly 14 is in the extended position. In the extended position, the head restraint assembly 14 extends beyond a front surface of the seat back 12. The occupant may release and move the head restraint assembly 14 to the extended position. In the extended position, the head restraint assembly 14 may comfortably support the head of the occupant. In one embodiment, there are approximately twenty-five degrees between the extended position and the design position. Of course, the extended position illustrated in merely exemplary. Any position from the design position towards the direction indicated by arrow $D_1$ is suitable as the extended position. Additionally, the head restraint assembly 14 may have multiple extended positions.

In FIG. 3, the head restraint assembly 14 is in the retracted position. In the retracted position, the head restraint assembly 14 is compact relative to the design position and the extended position. The retracted position allows the occupant to decrease the overall height of the vehicle seat 10, which may be desired when folding and/or storing the vehicle seat 10. In at least one embodiment, the head restraint assembly 14 moves from the design position in the direction indicated by arrow $D_2$ to the retracted position while the seat back 12 pivots relative to a seat bottom in a direction indicated by $D_B$ to permit ingress and egress to and from a rear seating row and/or to fold the vehicle seat 10 in order to store the vehicle seat 10 within or out of the vehicle. Of course, the head restraint assembly 14 can travel in a direction opposite to $D_2$ to return to the design position and beyond to the extended position. In one embodiment, there are approximately ninety degrees between the retracted position and the design position. Of course, the illustrated retracted position is merely one example. Any position from the design position towards the direction indicated by arrow $D_2$ is suitable. Additionally, the head restraint assembly 14 may have multiple retracted positions.

Figure 4:
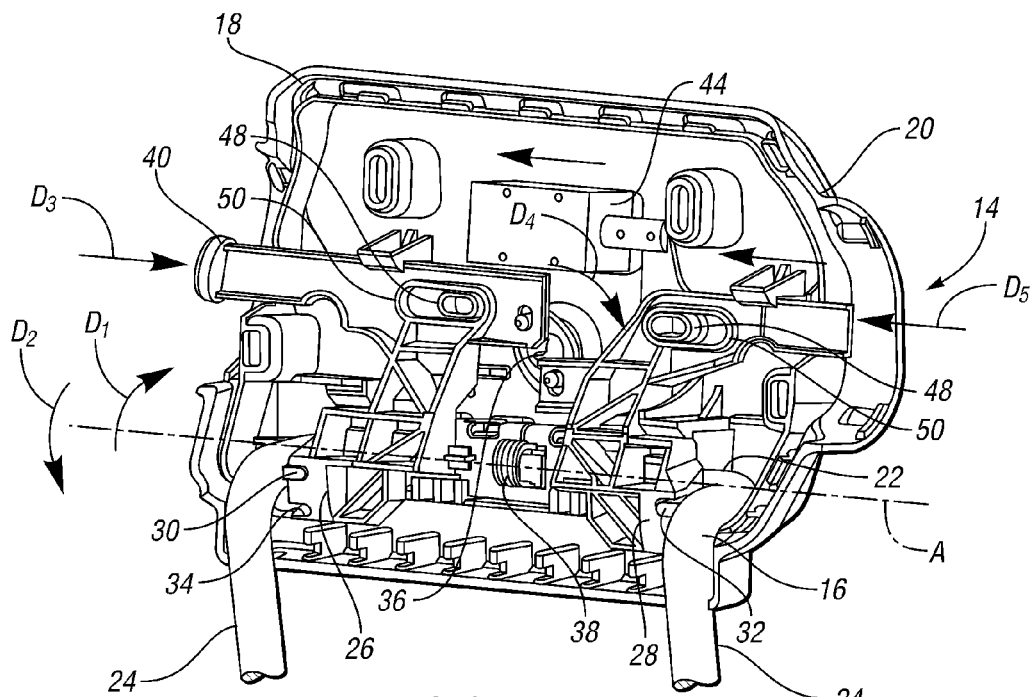
FIG. 4 is a perspective view of a portion of the head restraint assembly of FIG. 1 with a locking mechanism illustrated locked in the design position.
Figure 5:
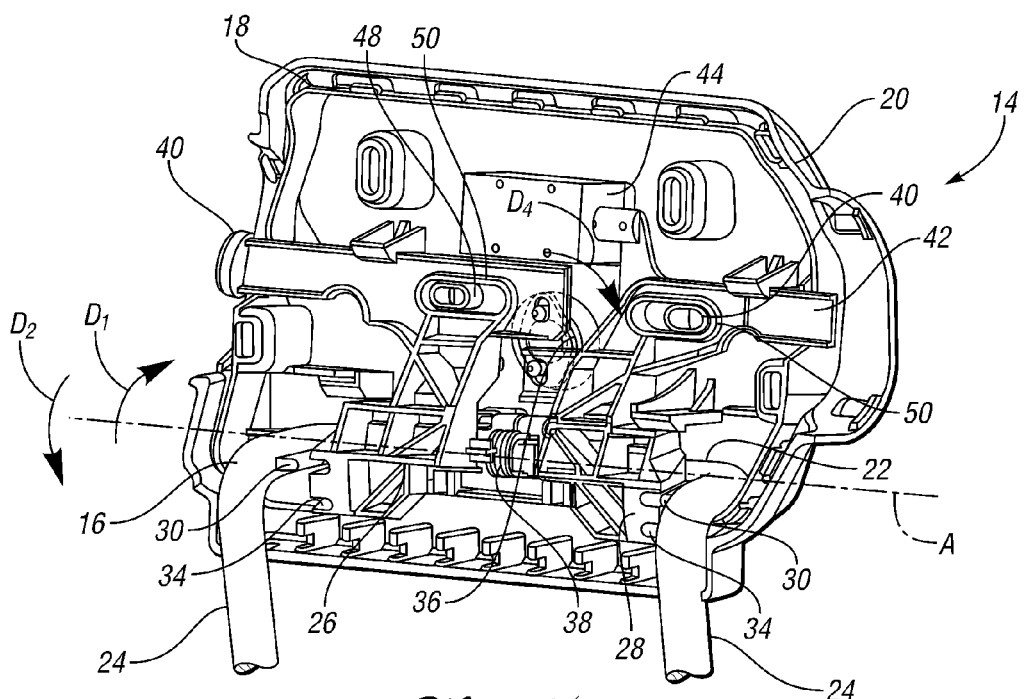
FIG. 5 is a perspective view of a portion of the head restraint assembly of FIG. 1 with a locking mechanism illustrated unlocked in the design position.
Figure 6:
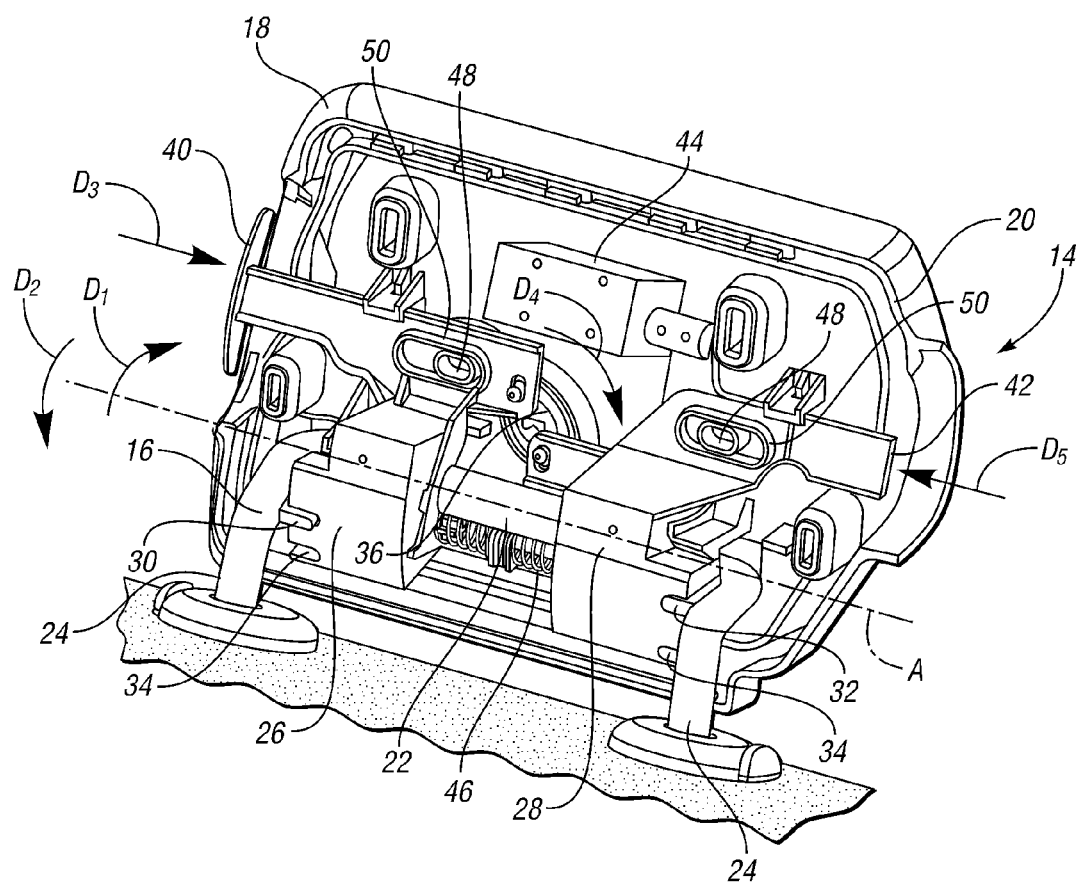
FIG. 6 is a perspective view of another embodiment of the head restraint assembly.
Figure 7:
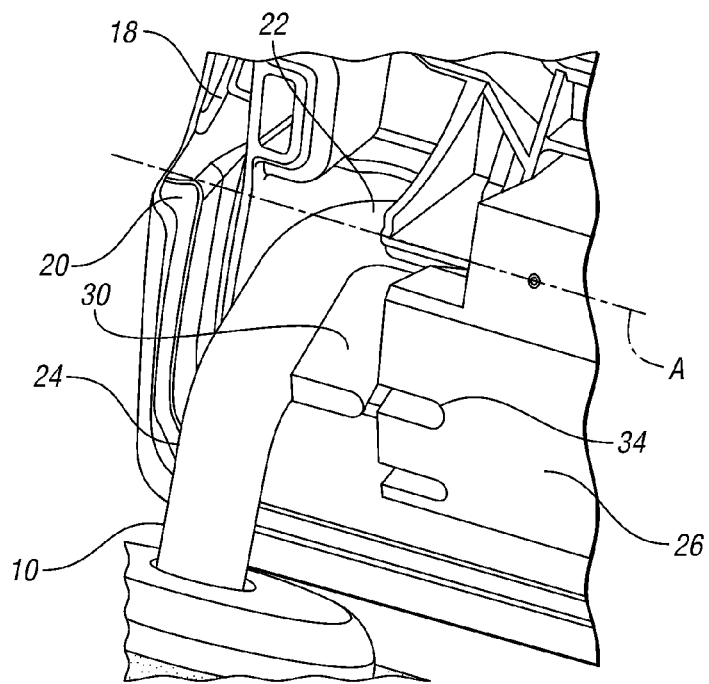
FIG. 7 is an enlarged perspective view of a portion of the head restraint assembly of FIG. 6.

With reference now to FIGS. 4-6, a portion of the head restraint 18 is removed for illustration purposes. In at least one embodiment, a front housing 20 and a rear housing form the head restraint 18. The rear housing, as illustrated, is removed to expose inner components of the head restraint assembly 14. Of course, any suitable head restraint 18 configuration is contemplated within the scope of the disclosed embodiments.

In the illustrated embodiment, the head restraint assembly 14 is mounted on the support rod 16. A pair of support rods 16 are integrally formed as a single support rod 16. In another embodiment, the support rods 12 are separately formed and mounted within the head restraint assembly 14. Any suitable amount of rods 16 are contemplated within the scope of the embodiments disclosed.

As illustrated, the support rod 16 has a lateral portion 22 and a pair of upright portions 24 at opposing ends of the lateral portion 22. The lateral portion 22 may connect each of the upright portions 24. The lateral portion 22 and the pair of upright portions 24 can be integrally formed or joined in a suitable manner. In another embodiment, two lateral portions 22 are provided along the axis A and are each connected to one of the pair of upright portions 24.

In one embodiment, the lateral portion 22 of the support rod 16 spans along axis A, which is the axis of rotation between the retracted position and the extended position for the head restraint 18. Since the head restraint 18 rotates about the axis A that is within the head restraint assembly 14, the size of the head restraint assembly 14 is reduced when compared to the prior art.

In FIG. 4, the head restraint assembly 14 is locked in the design position and in FIG. 5, the head restraint assembly 14 is unlocked and remains in the design position for illustrative purposes. A first locking plate 26 and a second locking plate 28 are each slideably mounted to the lateral portion 22 of the support rod 16. The first locking plate 26 and the second locking plate 28 are retained within the head restraint 18 and may be moveably mounted therein in a suitable manner. The first locking plate 26 and the second locking plate 28 are each engageable and disengageable with a corresponding first locking tab 30 and a second locking tab 32 to lock and unlock the head restraint assembly 14.

The first locking plate 26 and the second locking plate 28 can each engage with a corresponding first locking tab 30 and second locking tab 32 to retain the head restraint assembly 14 in the locked position. The first locking tab 30 and the second locking tab 32 may each be received within one of the plurality of notches 34 provided within each of the locking plate 26 and the second locking plate 28. In at least one embodiment, the first and second locking tabs 30, 32 are formed as notches within the support rod 16 and the plurality of notches 34 are a plurality of tabs that can be received within the first and second locking notches. Alternatively, the first and second locking tabs 30, 32 and the plurality of notches 34 can each include a coordinating combination of tabs and notches. As illustrated, the first and second locking tabs 30, 32 are mounted to the support rod 16 so that rotation of the head restraint assembly 14 does not rotate the first and second locking tabs 30, 32.

The first locking plate 26 and the second locking plate 28 may be connected to one another by a rotary link 36. Displacement of one of the first and second locking plates 26, 28 rotates the rotary link 36 to force a corresponding displacement of the other of the first and second locking plates 26, 28. The rotary link 36 may be pivotally mounted to the head restraint 18 to anchor the first and second locking plates 26, 28 to the head restraint 18.

As depicted, a biasing member 38 is mounted on the lateral portion 22 of the support rod 16. The biasing member 38 is connected to the support rod 16 at a first end. Alternatively, the biasing member 38 may be affixed at the first end to a connector that is mounted to the support rod 16 so that connector does not pivot about the axis A. At a second end, opposite the first end, the biasing member 38 may be mounted to the head restraint 18, the first locking plate 26 and/or the second locking plate 28. Since the head restraint 18, the first locking plate 26 and the second locking plate 28 are pivotally mounted to the support rod 16, the biasing member 38 biases the head restraint assembly 18 to pivot about the axis A. In one embodiment, the biasing member 38 biases the head restraint assembly 18 in the direction indicated by arrow $D_2$, which is towards the retract position. In at least one embodiment, the biasing member 38 biases the head restraint assembly 18 in the direction indicated by arrow $D_1$, which is towards the extended position.

As illustrated in FIG. 4-6, engagement between the first locking plate 26 and the first locking tab 30, and the second locking plate 28 and the second locking tab 32 locks the head restraint assembly 14 in the design position or the extended position. Any desired position for the design and extended positions of the head restraint assembly 14 may be achieved by providing additional notches 34 in the first and second locking plates 26, 28 to lock the head restraint 18 in the desired position. Although two notches 34 are illustrated, any suitable amount of notches 34 can be provided within the first locking plate 26 and the second locking plate 28.

In one embodiment, the occupant can mechanically unlock the head restraint assembly 14 by displacing a push button 40 that may be externally visible to the occupant. The occupant may displace the push button 40 by pressing in a direction indicated by arrow $D_3$. The push button 40 can be mounted to the first locking plate 26 to displace the first locking plated 26. In another embodiment, the push button 40 is integrally formed with the first locking plate 26. Any suitable mechanical actuator serving as the push button 40 to cooperate with the first locking plate 26 is contemplated within the scope of the disclosed embodiments.

Displacement of the push button 40 and the first locking plate 26 in the direction indicated by arrow $D_3$, disengages the first locking plate 26 from the first locking tab 30 and concurrently rotates the rotary link 36 in the direction indicated by arrow $D_4$, which is illustrated in FIG. 5. Rotation of the rotary link 36 pulls the second locking plate 28 in a direction indicated by arrow $D_5$ to disengage the second locking plate 28 from the second locking tab 32, which is depicted in FIG. 5.

In another embodiment, a second push button 42 may be mounted to the second locking plate 28 to displace the second locking plate 28 in the direction indicated by arrow $D_5$. In still another embodiment, a linear electrical actuator 44 is mounted within the head restraint 18 and is connected to the second locking plate 28 to move the second locking plate 28 in the direction indicated by arrow $D_5$ when activated. The electrical actuator 44 may be remotely activated by a signal sent from a remote location.

Once the second locking plate 28 is moved by either the second push button 42 or the electrical actuator 44 in the direction $D_5$, the second locking plate 28 is disengaged from the second locking tab 32. Concurrently the second locking plate 28 rotates the rotary link 36 in a direction opposite to that indicated by arrow $D_4$, which is illustrated in FIG. 5. Rotation of the rotary link 36 pulls the first locking plate 26 in a direction indicated by arrow $D_3$ to disengage the first locking plate 26 from the first locking tab 30, which is depicted in FIG. 5. Any suitable actuator serving as the push button 42 or electrical actuator 44 to cooperate with the second locking plate 28 is contemplated within the scope of the disclosed embodiments.

Figure 8:
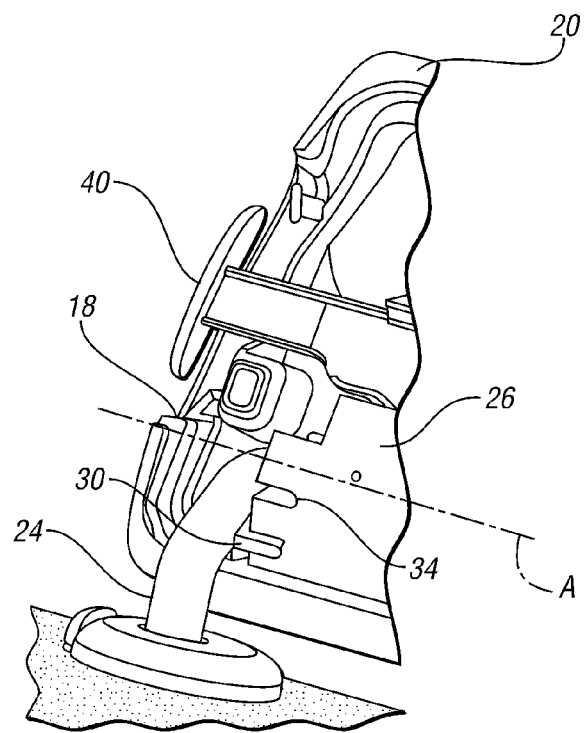
FIG. 8 is a perspective view of another embodiment of a portion of the head restraint assembly of FIG. 7 in an extended position.

As depicted in FIG. 5, the first and second locking plates 26, 28 are disengaged from the first and second locking tabs 30, 32, by any one of the actuators 40, 42 or 44. The biasing member 38 can then pivot the head restraint assembly 14 in the direction indicated by arrow $D_2$. Alternatively, the occupant can apply a force to the head restraint assembly 14 in the direction indicated by arrow $D_1$ to move the head restraint assembly 14 into the extended position. In the extended position, the first and second locking plates 26, 28 are engaged with the first and second locking tabs 30, 32. An example of the engagement between the first locking plate 26 and the first locking tab 30 is illustrated in FIG. 8.

When the head restraint assembly 14 is in the retracted position, no corresponding notch is provided in the first or second locking plates 26, 28. The occupant can apply a force in the direction indicated by arrow $D_1$ to move the head restraint assembly 14 towards design position without having release the head restraint assembly 14.

In at least one embodiment illustrated in FIG. 6, a second biasing member 46 is provided between the first and second locking plates 26, 28 to force the first locking plate 26 to return in the direction indicated by arrow $D_5$ and to force the second locking plate 28 to return in the direction indicated by arrow $D_3$. The second biasing member 46 may be mounted to the head restraint 18 to stabilize the second biasing member 46. In another embodiment, the second biasing member 46 is mounted on the rotary link 36 to bias the rotary link 36 in a direction opposite to the direction indicated by arrow $D_4$, which would force the first and second locking plates 26, 28 to each return in opposite directions.

Referring again to FIGS. 4-6, guides 48 protrude from the head restraint 18. Corresponding apertures 50 are provided in each of the first and second locking plates 26, 28. As the first and second locking plates 26, 28 are moving oppositely moving in the directions indicated by arrows $D_3$ and $D_4$, the first and second locking plates 26, 28 slide along the guides 48. The guides 48 stabilize each of the first and second locking plates 26, 28 to prevent movement in undesired directions.

While various embodiments have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle head restraint system for a vehicle seat comprising:
   a support rod adapted to be mounted to a vehicle proximate to the vehicle seat, the support rod having a lateral portion;
   a head restraint moveable relative to the lateral portion in a fore/aft direction;
   a first locking plate movably mounted to the head restraint to engage the support rod to lock the head restraint relative to the support rod in one of an intermediate position and an extended position;
   a second locking plate movably mounted to the head restraint to engage the support rod to lock the head restraint relative to the support rod in one of the intermediate position and the extended position;
   a rotary link pivotally connected to the head restraint and interconnecting the first locking plate and the second locking plate;
   a biasing member mounted between the support rod and at least one of the first locking plate and the second locking plate to bias the head restraint towards a retracted position; and
   an actuator provided on the head restraint to move one of the first locking plate and the second locking plate such that the rotary link moves the other of the first locking plate and the second locking plate for disengaging the first and second locking plates from the support rod so that the biasing member biases the head restraint towards the retracted position.

2. The vehicle head restraint system of claim 1 wherein the support rod further comprises:
   a first locking tab to engage with the first locking plate; and
   a second locking tab to engage with the second locking plate.

3. The vehicle head restraint system of claim 2 wherein the first locking plate has at least one notch formed therein such that the first locking tab is sized to be received therein; and
   wherein the second locking plate has at least one notch formed therein such that the second locking tab is sized to be received therein.

4. The vehicle head restraint system of claim 2 wherein the first locking tab is provided on a first upright portion of the support rod and the second locking tab is provided on a second upright portion of the support rod.

5. The vehicle head restraint system of claim 4 wherein the first upright portion and the second upright portion are provided at opposing ends of the lateral portion of the support rod.

6. The vehicle head restraint system of claim 1 wherein the actuator further comprises a single push button that is mechanically actuatable such that a second actuator is not required.

7. The vehicle head restraint system of claim 6 wherein the push button is provided on an external surface of the head restraint.

8. The vehicle head restraint system of claim 7 wherein the push button is connected to the first locking plate such that actuation of the push button moves the first locking plate to disengage from the support rod and pivots the rotary link to move the second locking plate from engagement with the support rod.

9. The vehicle head restraint system of claim 1 wherein the actuator further comprises an electrical actuator such that the electrical actuator is remotely actuatable.

10. The vehicle head restraint system of claim 9 wherein the electrical actuator is provided within the head restraint and is connected to the second plate such that the such that actuation of the electrical actuator moves the second locking plate to disengage from the support rod and rotates the rotary link to move the first locking plate from engagement with the support rod.

11. The vehicle head restraint system of claim 1 further comprising a biasing member provided between the first locking plate and the second locking plate to bias the first locking plate and the second locking plate apart.

12. The vehicle head restraint system of claim 1 wherein the head restraint further comprises a first guide member to guide motion of the first locking plate.

13. The vehicle head restraint system of claim 12 wherein the first guide member cooperates with an aperture formed in the first locking plate to guide motion of the first locking plate.

14. The vehicle head restraint system of claim 12 wherein the head restraint further comprises a second guide member to guide motion of the second locking plate.

15. The vehicle head restraint system of claim 14 wherein the second guide member cooperates with an aperture formed in the second locking plate to guide motion of the second locking plate.

16. A vehicle seat comprising:
   a seat back adapted to be pivotally mounted within a vehicle;
   a support rod mounted to the seat back, the support rod having a lateral portion;
   a head restraint moveable relative to the lateral portion in a fore/aft direction;
   a first locking plate movably mounted to the head restraint to engage the support rod to lock the head restraint relative to the support rod in one of an intermediate position and an extended position;
   a second locking plate movably mounted to the head restraint to engage the support rod to lock the head restraint relative to the support rod in one of the intermediate position and the extended position;
   a rotary link pivotally connected to the head restraint and interconnecting the first locking plate and the second locking plate;
   a biasing member mounted between the support rod and at least one of the first locking plate and the second locking plate to bias the head restraint towards a retracted position; and
   an actuator provided on the head restraint to move one of the first locking plate and the second locking plate such that the rotary link moves the other of the first locking plate and the second locking plate for disengaging the first and second locking plates from the support rod so that the biasing member biases the head restraint towards the retracted position.

17. The vehicle seat of claim 16 wherein the seat back is adapted to be pivotally mounted within the vehicle such that the head restraint is moveable from the intermediate position to the retracted position as the seat back pivots.

18. The vehicle seat of claim 16 wherein the support rod further comprises:
   a first locking tab to engage with the first locking plate; and
   a second locking tab to engage with the second locking plate.

19. The vehicle seat of claim 18 wherein the first locking plate has at least one notch formed therein such that the first locking tab is sized to be received therein; and
   wherein the second locking plate has at least one notch formed therein such that the second locking tab is sized to be received therein.

20. A vehicle head restraint system for a vehicle seat comprising:
   a support rod adapted to be mounted to a vehicle proximate to the vehicle seat, the support rod having a lateral portion and having a first locking tab and a second locking tab;
   a head restraint moveable relative to the lateral portion in a fore/aft direction, the head restraint having a first guide member and a second guide member formed therein;
   a first locking plate movably mounted to the head restraint and having a plurality of notches formed therein for engaging the first locking tab to lock the head restraint relative to the support rod in one of an intermediate position and an extended position, the first locking plate having an aperture formed therein to receive the first guide member;
   a second locking plate movably mounted to the head restraint and having a plurality of notches formed therein for engaging the second locking tab to lock the head restraint relative to the support rod in one of the intermediate position and the extended position, the second locking plate having an aperture formed therein sized to receive the .second guide member;
   a rotary link pivotally connected to the head restraint and interconnecting the first locking plate and the second locking plate;
   a first biasing member mounted between the support rod and at least one of the first locking plate and the second locking plate to bias the head restraint towards a retracted position; and
   an actuator provided on the head restraint to move one of the first locking plate and the second locking plate such that the rotary link moves the other of the first locking plate and the second locking plate for disengaging the first and second locking plates from the first and second locking tabs so that the biasing member biases the head restraint towards the retracted position.

* * * * *